United States Patent Office 3,174,948
Patented Mar. 23, 1965

3,174,948
STABILIZATION OF OXYMETHYLENE
COPOLYMERS
James E. Wall, Westfield, N.J., and Eldred T. Smith and Gene J. Fisher, Corpus Christi, Tex., assignors to Celanese Corporation of America, New York, N.Y., a corporation of Delaware
No Drawing. Filed Apr. 11, 1961, Ser. No. 102,096
3 Claims. (Cl. 260—67)

This invention relates to the hydrolysis of polymers and particularly to the stabilization of oxymethylene copolymers by hydrolysis.

Thermally stable oxymethylene copolymers may be prepared by copolymerizing trioxane with from 0.1 to 15 mol percent of a cyclic ether having adjacent carbon atoms. Copolymers of this type are described in U.S. Patent No. 3,027,352 by Walling, Brown and Bartz. Such copolymers may be described as having at least one chain containing from 85 to 99.9 mol percent of oxymethylene units interspersed with between 0.1 and 15 mol percent of —O—R— units wherein R is a divalent radical containing at least two carbon atoms directly linked to each other and positioned in the chain between the two valences, with any substituent in the R radical being inert. The preferred copolymers have melting points not less than 150° C. The preferred copolymers are those made up of oxymethylene and oxyethylene groups such as copolymers of trioxane with dioxolane or with ethylene oxide.

The method of enhancing the thermal stability of such copolymers by hydrolysis is disclosed in application Serial No. 23,658, filed April 21, 1960, by Frank M. Berardinelli, which is now abandoned in favor of continuation-in-part application S. No. 102,097, filed April 11, 1961. In accordance with this method, the copolymer, preferably in solution, is subjected to the action of a hydrolysis medium, preferably in the presence of an alkaline material to degrade and remove comparatively thermally unstable oxymethylene end groups of the polymer and to leave a residual polymer having in the terminal positions comparatively thermally stable oxyalkylene units with adjacent carbon atoms.

This invention relates to an improvement in the hydrolysis reaction achieved by the use of a novel solvent medium. In accordance with this invention the hydrolysis reaction takes place in a solvent medium comprising a mixture of water and a water-soluble, normally liquid, non-acidic organic compound having an oxygen atom of the group consisting of hydroxy oxygen atoms, etheric oxygen atoms and non-terminal carbonyl oxygen atoms directly bonded to a carbon atom. Most suitably the solvent medium comprises from about 10 to about 90 weight percent of water and from about 10 to about 90 weight percent of the water-soluble, normally liquid, non-acidic organic compound. Among the organic compounds which may be used are alcohols such as methanol, ethanol, propanol, isopropyl alcohol, tertiary butyl alcohol and allyl alcohol; glycols such as ethylene glycol; ketones such as acetone and methyl ethyl ketone; alkanolamines such as mono-, di- and triethanolamine; esters such as methyl acetate and methyl formate; and ethers such as methyl isopropyl ether, methylal, m-dioxane and p-dioxane.

The solvent mixtures are single phase mixtures and the water solubility of the organic compound must be at least to the extent of permitting the formation of a single phase mixture of desired proportions at the solution temperature.

The preferred organic compounds are the water soluble, normally liquid alkanols and the invention is described below primarily in terms of such alkanols, it being understood that other oxygen-containing compounds, of the class defined above, which are water soluble, normally liquid and non-acidic may also be used.

It has been found that aqueous mixtures of such compounds permit complete solution of the copolymer at lower temperatures than either the water or the alkanol, alone, and thus permit the hydrolysis to proceed more rapidly and at lower temperatures than was previously possible except when expensive and exotic solvents were used.

The temperature of the hydrolysis treatment is above the solution temperature of the copolymer in the aqueous alkanol and suitably between about 100° and 250° C. At higher temperatures within this range the hydrolysis treatment is conducted under sufficient pressure to maintain the liquid phase. The preferred temperature range is between about 150° and about 200° C.

The alkaline material is preferably soluble in the aqueous alkanol medium and may be a strongly basic hydroxide such as the hydroxide of an alkali metal, or it may be the salt of a strong base and a weak acid, or it may be ammonia or an organic base, such as an amine or an amidine.

Among the specific alkaline materials which may be used are sodium hydroxide, potassium hydroxide, sodium carbonate, sodium acetate, ammonium hydroxide, triethanolamine, tripropylamine, trimethylguanidine, trimethylamine and tributylamine.

The amount of alkaline material may vary widely, depending on the specific copolymer, specific alkaline material and the hydrolysis conditions.

From zero to about one pound of alkaline material may be used per pound of copolymer, but preferably at least 0.001 pound of alkaline material per pound of copolymer should be present. When no alkaline material is used, it is desirable to hydrolyze in a buffered system since the products of hydrolysis are acidic and would cause the system to become acidic. Degradation under strongly acidic conditions is not selective. Alkaline hydrolysis is preferable over neutral hydrolysis since it is more rapid and since the alkaline material neutralizes excess polymerization catalyst which would otherwise tend to degrade the polymer during the hydrolysis step.

The preferred proportion of alkaline material is from about 0.001 to about 0.2 pound of alkaline material per pound of copolymer. Where ammonia is used as the alkaline material, it is preferred to use between about 0.001 and about 0.05 pound of ammonia per pound of copolymer to avoid the formation of odor-containing by-products.

The solvent mixture is suitably used in amounts between about 1 and about 50 pounds per pound of copolymer and preferably between about 3 and about 20 pounds per pound of copolymer.

The hydrolysis reaction may take from about 15 seconds to about 20 minutes with from about 1 to 2 minutes being preferred.

In one advantageous method of operation, the polymerization product may be quenched with a quenching medium which is also suitable as a hydrolysis medium. For example, a polymerization product removed from a polymerization zone at a temperature between about 60° and about 116° C. may be quenched with from about 5 to about 50 times its weight of a water-methanol mixture containing from about 30 to about 90 wt. percent of methanol, based on the weight of the mixture. The mixture of polymerization product and quench medium is wet ground to break up the larger particles of polymer and the slurry (having from about 2 to about 20 wt. percent of solids) is suitable for hydrolysis. From about 10 to about 1000 p.p.m. of ammonia (based on the weight of solid polymer) is added and the slurry is passed through a double pipe exchanger wherein it reaches a temperature between about 150° and about 180° C. and a pressure between about 230 and about 300 p.s.i.g. Under these conditions, the polymer dissolves in the slurry medium. The residence time in the pipe exchanger is between about 30 and about 160 seconds. Water is then added in a mix tee to reduce the temperature to between 30° and about 95° C. to precipitate the polymer.

Isopropyl alcohol-water mixtures are particularly desirable as solvent media since the copolymers precipitate therefrom in granular form.

During the hydrolysis reaction a portion of the copolymer is decomposed to formaldehyde resulting in a weight loss of copolymer. The hydrolysis reaction is complete when the weight loss substantially ceases. Typically, between about 5 and 40 weight percent of polymer may be lost before the rate of weight loss drops to between about 0.1% and 5% of the original rate of weight loss indicating substantial completion of the hydrolysis process.

After completion of the hydrolysis reaction, the copolymer may be precipitated from solution, if necessary, as by cooling as described above, or by adding a large amount of a non-solvent, and then be washed with water and dried.

It is generally desirable to incorporate one or more thermal stabilizers into the copolymer in order to bring its thermal degradation level even lower.

The proportion of stabilizer incorporated depends upon the specific stabilizer used. A proportion between about 0.05 and 10 weight percent (based on the weight of polymer) has been found to be suitable for most stabilizers.

One suitable stabilizer system is a combination of an anti-oxidant ingredient, such as phenolic anti-oxidant and most suitably a substituted bisphenol, and an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylenebis-(4-methyl - 6 - tertiarybutyl phenol) and 4,4'-butylidenebis-(6-tertiarybutyl-4-methyl phenol). Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrollidone, hydrazides, compounds having 1 to 6 amide groups, proteins, compounds having tertiary amine and terminal amide groups, compounds having amidine groups, cycloaliphatic amine compounds and aliphatic acylureas. Suitable scission inhibitors as well as suitable anti-oxidants and proportions are disclosed in application Serial No. 826,115, filed by Dolce on July 10, 1959, application Serial No. 831,720, filed by Dolce, Berardinelli and Hudgin on August 5, 1959, application Serial No. 838,427, filed by Berardinelli on September 8, 1959, now abandoned in favor of continuation-in-part application S. No. 258,126, filed on February 13, 1963, application Serial No. 838,832, filed by Dolce and Hudgin on September 9, 1959, application Serial No. 841,690, filed by Kray and Dolce on September 23, 1959, now abandoned in favor of continuation-in-part application S. No. 262,348 filed March 4, 1963, application Serial No. 851,560, filed by Berardinelli, Kray and Dolce on November 9, 1959, now abandoned in favor of continuation-in-part application S. No. 256,146 filed February 4, 1963, application Serial No. 1,457, filed by Dolce and Berardinelli on January 11, 1960, and application Serial No. 4,881, filed by Kray and Dolce on January 27, 1960. The disclosures of the above-mentioned applications are incorporated herein by reference.

The stabilizers may be incorporated into the polymer by dissolving both the polymer and the stabilizer in a common solvent and thereafter evaporating the solution to dryness. Alternatively, the stabilizers may be incorporated into the polymer by applying a solution of the stabilizer to finely divided polymer, as in a slurry, and thereafter filtering the polymer and evaporating to dryness. The stabilizer, in finely divided dry state may be blended into finely divided polymer in any suitable blending apparatus.

One suitable method of incorporation of the chemical stabilizers is by blending a dry solid stabilizer into the plastic polymer, while the latter is being kneaded as on heated rolls or through an extruder.

Example I (a) A mixture of 100 parts by weight of trioxane, 2.4 parts of ethylene oxide, 1.1 parts of cyclohexane, 840 p.p.m. of methylal and 70 p.p.m. of boron trifluoride (as the dibutyl etherate complex) were fed to one end of an elongated continuous mixer.

The temperature in the mixer rose to a maximum of 105° to 115° C. at the discharge point. Residence time in the mixer was about 1 minute.

(b) The discharged product was mixed in a wet grinder with 1250 parts of a solution of 59.9 wt. percent of methanol, 40 wt. percent of water and 0.1 wt. percent of ammonia and ground to produce a slurry of 8% solids content. The slurry was passed into a doublepipe exchanger wherein it was heated to 320° F. and 240 p.s.i.g. The polymer dissolved. After 45 seconds in the exchanger, water was added in a mixing tee to reduce the temperature and precipitate the polymer.

Example II

A sample of a copolymer prepared in the manner as described in Example Ia was quenched in an ammonia-free methanol-water solution (60–40 ratio by weight), removed and dried. A mixture of 130 parts by weight of the dry polymer and 867 parts by weight of a solution containing 59.9 wt. percent isopropyl alcohol, 40.0 wt. percent water and 0.1 wt. percent ammonia was heated rapidly to 160° C. and 150 p.s.i.g. in a 3-liter rocking autoclave. As soon as the temperature reached 160° C. the autoclave was immersed in a water bath to reduce the temperature rapidly and precipitate the polymer. The polymer precipitated as a uniform granular mass containing approximately 95% of the mother liquor.

Example III

A mixture of 130 parts by weight of a polymer (preparation described in Example Ia) and 867 parts by weight of a solution containing 58 wt. percent acetone, 41.9 wt. percent water and 0.1 wt. percent sodium acetate was treated in a 3-liter autoclave as described in Example II. The polymer sample precipitated as a uniform granular mass containing approximately 95% of the mother liquor.

Example IV

Example II was repeated except that instead of 867 parts of water-isopropyl alcohol mixture, 867 parts of isopropyl alcohol was used. The polymer melted but was only slightly soluble in the alcohol. Upon cooling, the polymer solidified as the polymer-rich phase of a two phase system. The product was a hard, nonfriable chunk containing approximately 15% of the mother liquor.

Example V

Example II was repeated except that 867 parts of water was used instead of the water-isopropyl alcohol mixture. The results were similar to those of Example IV.

It is to be understood that the foregoing detailed description is given merely by way of illustration and that many variations may be made therein without departing from the spirit of our invention.

Having described our invention what we desire to secure by Letters Patent is:

1. In the process for the stabilization of a moldable oxymethylene polymer having at least one chain containing
   (1) from about 85 to 99.9 mol percent of oxymethylene units interspersed with
   (2) from about 0.1 to about 15 mol percent of —O—R— units wherein R is a divalent radical containing at least two carbon atoms directly linked to each other and positioned in the chain between the two valences with any substituents in said R radical being inert,
   at least part of the terminal units of the molecules of said polymer being comparatively thermally unstable hydroxy-substituted oxymethylene units of higher susceptibility to thermal degradation than terminal units derived from said —O—R— units,
   said process comprising selectively removing said comparatively thermally unstable terminal units in the presence of a hydrolysis medium,
   the improvement wherein said hydrolysis medium comprises a mixture of
   (1) water and
   (2) a water soluble, normally liquid, non-acidic organic compound having an oxygen atom directly bonded to a carbon atom, said oxygen atom being selected from the group consisting of
      (a) etheric oxygen atoms and
      (b) non-terminal carbonyl oxygen atoms selected from the group consisting of ketone oxygen atoms and ester oxygen atoms.

2. The process of claim 1 wherein said water is present in an amount between about 10 and about 90 weight percent of water and from about 10 to about 90 weight percent of said water soluble, normally liquid, non-acidic organic compound.

3. In the process for the stabilization of a moldable oxymethylene polymer having at least one chain containing
   (1) from about 85 to 99.9 mol percent of oxymethylene units interpersed with
   (2) from about 0.1 to about 15 mol percent of —O—R— units wherein R is a divalent radical containing at least two carbon atoms directly linked to each other and positioned in the chain between the two valences with any substituents in said R radical being inert,
   at least part of the terminal units of the molecules of said polymer being comparatively thermally unstable hydroxy-substituted oxymethylene units of higher susceptibility to thermal degradation than terminal units derived from said —O—R— units,
   said process comprising selectively removing said comparatively thermally unstable terminal units at a temperature between about 100° and about 250° C. in the presence of a hydrolysis medium,
   the improvement wherein said hydrolysis medium comprises a mixture of
   (1) water and
   (2) a water soluble, normally liquid, non-acidic organic compound having an oxygen atom directly bonded to a carbon atom, said oxygen atom being selected from the group consisting of
      (a) etheric oxygen atoms and
      (b) non-terminal carbonyl oxygen atoms selected from the group consisting of ketone oxygen atoms and ester oxygen atoms.

References Cited in the file of this patent

UNITED STATES PATENTS

| | | |
|---|---|---|
| 2,399,456 | Yates et al. | Apr. 30, 1946 |
| 2,732,370 | Codding | Jan. 24, 1956 |
| 2,920,059 | MacDonald et al. | Jan. 5, 1960 |
| 2,921,047 | Smith | Jan. 12, 1960 |
| 2,989,509 | Hudgin et al. | June 20, 1961 |
| 3,000,860 | Brown et al. | Sept. 19, 1961 |
| 3,027,352 | Walling et al. | Mar. 27, 1962 |
| 3,103,499 | Dolce et al. | Sept. 10, 1963 |